(No Model.)

B. P. MORRISON.
SPRING GEAR FOR VEHICLES.

No. 316,640. Patented Apr. 28, 1885.

WITNESSES:
J. Cook
E. Sedgwick

INVENTOR:
B. P. Morrison
BY Munn & Co
ATTORNEYS.

United States Patent Office.

BENJAMIN P. MORRISON, OF MARION, VIRGINIA.

SPRING-GEAR FOR VEHICLES.

SPECIFICATION forming part of Letters Patent No. 316,640, dated April 28, 1885.

Application filed October 9, 1884. (No model.)

*To all whom it may concern:*

Be it known that I, BENJAMIN P. MORRISON, of Marion, in the county of Smyth and State of Virginia, have invented a new and useful Improvement in Spring-Gears for Vehicles, of which the following is a full, clear, and exact description.

My invention consists in equalizing-gear applied in connection with springs of the Concord pattern, as hereinafter described and claimed.

Reference is to be had to the accompanying drawings, forming a part of this specification, in which similar letters of reference indicate corresponding parts in all the figures.

Figure 1:
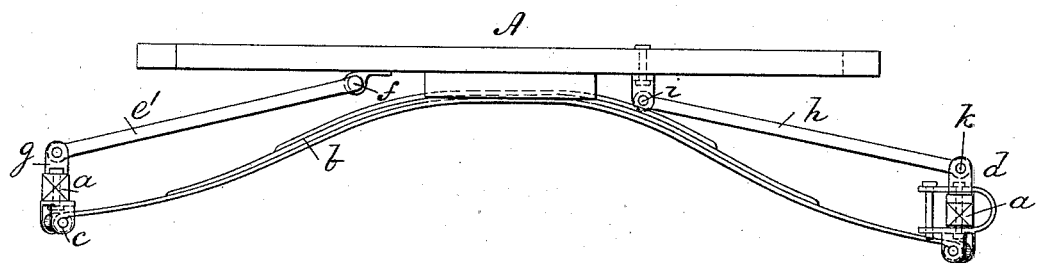
Figure 2:
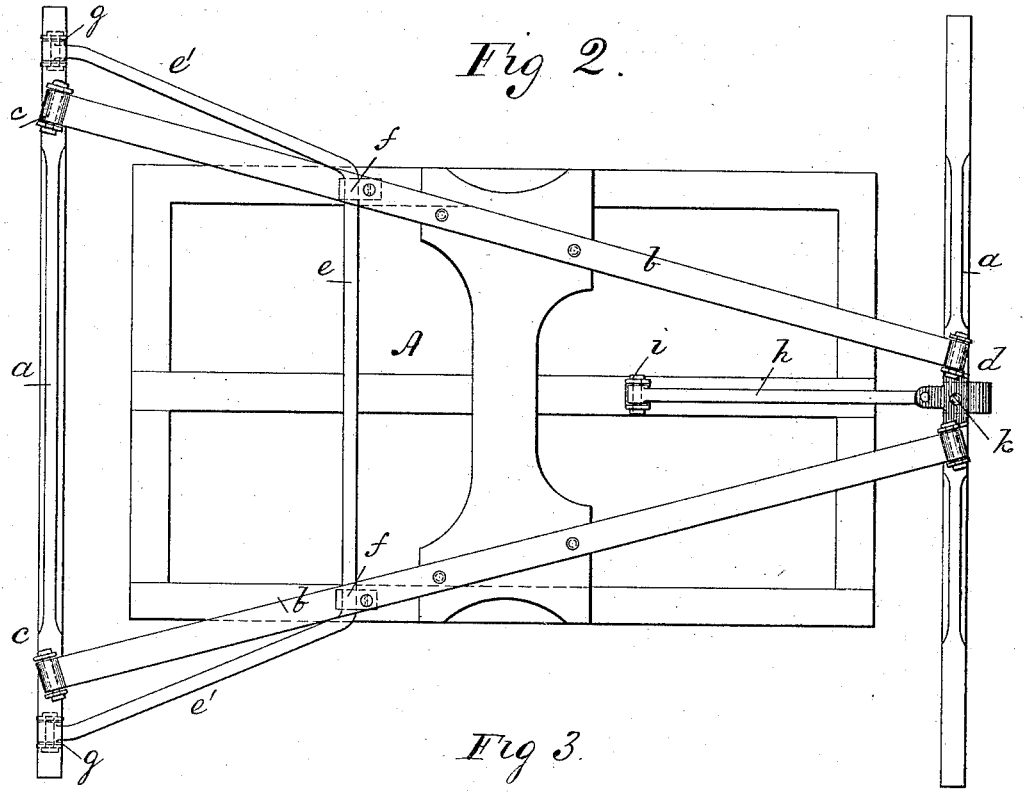
Figure 3:
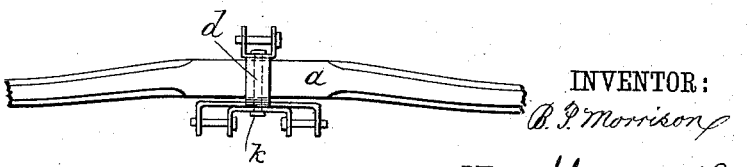

Figure 1 is a side elevation, and Fig. 2 an inverted plan view, of the gear. Fig. 3 is a detail front view of the forward axle.

A represents the bottom frame of a wagon or buggy body. *a a* are the axles, and *b b* the springs attached rigidly to the middle cross-bar of frame A and to the front and rear axles, as next described. The rear ends of springs *b* are pivoted in shackles *c*, which are clipped to the hind axle either above or below, (preferably below,) and the clips are placed at such a distance apart on the axle as will give good support to the body. The springs converge to the front axle, where they are connected to a combined triple shackle and loop, *d*.

Across the rear part of the frame or body A the equalizing-rod *e* is hung in boxes *f*. Its ends *e'* are bent outward, and extend to the rear axle, where they are jointed in shackles *g* at points outside the spring-shackles *c* and near the collars of the axles. This rod, by its resistance to torsional strain, compels the springs to flex alike, or nearly so, even though the load be nearly all on one spring, and the boxes *f* being at suitable distance from the axle, the effect is, that when the springs are lengthened by compression and move the axle back the arms *e'* of rod *e* likewise move the axle to the same extent, thereby preventing any twisting or rolling of the axle in its boxes. The ends or arms of rod *e*, being connected nearer the ends of the axle than are the springs, give greater support to the spring which is most heavily loaded, and by exerting a leverage on the spring lightly loaded cause it to be compressed and carry a portion of the load. The arms also better hold the axle at right angles to the center line of draft, the hind wheels "in track" under all conditions of load.

At the front is a rod, *h*, attached to a shackle, *i*, on the body, and to the upper shackle of the loop *d*, so as to stay the front axle and hold the loop from being turned on the king-bolt by the greater pressure forward of either spring that may be more heavily loaded. This stay also prevents rolling movements of this axle when the springs are compressed and when the wheels come in contact with obstacles in the same manner as the rod *e*. This stay *h* and the bent rod *e*, by causing the springs to flex in unison and to the same extent, thereby prevent tilting of the body to the side most heavily loaded, and to some degree prevent forward and backward tilting.

The front axle, *a*, is hung in loop *d* by a king-bolt, *k*. The ears on the loop that receive the springs and the rod *h* stand in line with those parts.

Usually the axle is strengthened at the center, which is its weakest point, by the axle-bed and fifth-wheel. In this case the axle-bed and fifth-wheel are dispensed with, and the axle strengthened in the vicinity of the king-bolt by the addition of a thickening-piece, as shown in Fig. 3, which is welded on, which gives the strength required to sustain any pressure which may be brought to bear at this point.

This spring-gear is inexpensive, simple, and durable, and works perfectly. The usual perch side bars, axle-beds, fifth-wheel, bolster, and body-loops are dispensed with.

Having thus described my invention, I claim as new and desire to secure by Letters Patent—

1. In a vehicle, the body A, axles *a a*, springs *b*, secured to the under side of the body at its middle and converging at their forward ends, the loop *d*, embracing the central part of the front axle and provided with a pair of shackles on one face, to which the converging ends of the springs are jointed, and a single shackle on the opposite face, as shown, shackles *c* on the rear axle, to which the diverging ends of the springs *b* are jointed, the rod *e*, journaled in bearings on the under side of the wagon-body, in rear of its center, and provided with bent ends $e'$, pivotally connected to the rear axle outside of the springs $b$, and the rod $h$, jointed at its rear end to the body in front of its center, and at its forward end in the single shackle of the loop $d$, substantially as set forth.

2. In a vehicle-spring of the character described, the loop $d$, provided on its under face with two shackles and on its upper face with a single shackle, substantially as shown and described.

BENJAMIN P. MORRISON.

Witnesses:
D. C. ZOLLICKOFFER,
W. BANISTER.